United States Patent
Kuo (10) Patent No.: US 7,419,303 B2
(45) Date of Patent: Sep. 2, 2008

(54) BALL CONNECTING BODY FOR A ROLLING MOTION APPARATUS

(75) Inventor: Chang-Hsin Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 323 days.

(21) Appl. No.: 11/424,255

(22) Filed: Jun. 15, 2006

(65) Prior Publication Data

US 2006/0222275 A1    Oct. 5, 2006

Related U.S. Application Data (63) Continuation-in-part of application No. 10/833,662, filed on Apr. 27, 2004, now abandoned.

(51) Int. Cl.
*F16C 29/06* (2006.01)
*F16H 1/24* (2006.01)

(52) U.S. Cl. .................. 384/51; 384/45; 74/424.88

(58) Field of Classification Search .................. 384/45, 384/49, 51, 520, 525–534; 74/424.88
See application file for complete search history.

(56) References Cited

U.S. PATENT DOCUMENTS 5,429,439 A * 7/1995 Hsu et al. .................. 384/45
5,562,346 A * 10/1996 Kuo .......................... 384/45
5,758,975 A * 6/1998 Kuo .......................... 384/45
5,993,064 A * 11/1999 Teramachi et al. .......... 384/51
6,116,783 A * 9/2000 Shirai et al. ................ 384/51
6,203,200 B1 * 3/2001 Teramachi .................. 384/51
6,352,367 B1 * 3/2002 Konomoto et al. .......... 384/45

* cited by examiner

*Primary Examiner*—Thomas R Hannon
(74) *Attorney, Agent, or Firm*—Banger Shia (57) ABSTRACT

A ball connecting body for a ball screw or a linear guide-way, comprises spacers, guide linking members, and connecting members. The spacers are interposed between two adjacent balls, thereby preventing the two balls from hitting. The guide linking members are used for linking the two spacers, so that the ball may be maintained in a space formed by the guide linking members and the spacers. The connecting member connects two adjacent spacers. The total width of the connecting member in a direction of a connecting line of the two guide linking members is smaller than the total height of the connecting member in a direction vertical to the connecting line of the two guide linking members, so that the connecting member has an excellent bendable capability in the direction of the connecting line of the two guide linking members.

2 Claims, 13 Drawing Sheets

BALL CONNECTING BODY FOR A ROLLING MOTION APPARATUS

BACKGROUND OF THE INVENTION

This application is a continuation of part of U.S. patent application Ser. No. 10/833,662 filed on Apr. 27, 2004 now abandoned, which claims the benefit of the earlier filing date.

1. Field of the Invention

The present invention relates to a ball connecting body for a rolling motion apparatus, and more particularly to a ball connecting body for a ball screw or a linear guide-way, thereby preventing the balls from colliding and rubbing each other. Especially, the ball connecting body of the present invention has a multi-directional bendable function by the special design of the connecting member.

2. Description of the Related Art

A conventional linear guide-way and ball screw employ rolling members, such as balls or rollers, to function as a force-transmitting medium, and application of the balls is the most popular. During the rotation process of the balls, the balls mutually collide and rub, thereby producing noise and causing inconvenience of operation. For solving this problem, the prior art simulates the method of the rotating ball bearing to make the plastic or rubber material into a belt-shaped ball connecting body for separating two adjacent balls, so that the two adjacent balls will not contact mutually. However, when applied to the rotating ball bearing, the linear guide-way or the ball screw, the ball connecting body cannot be bent in an arbitrary direction of the three-dimensional path due to its belt-shaped design, so that the ball circulation system is only moved along the two-dimensional plane, and cannot move along the three-dimensional path, for example, U.S. Pat. No., 2,366,120, 5,429,439, 5,562,346, and 5,758,975, thereby greatly limiting the circulation design of the linear guide-way and the ball screw. In addition, some designers may bend the conventional belt-shaped ball connecting body by the slight elasticity of the belt-shaped ball connecting body, for example, U.S. Pat. No. 5,993,064. However, it is difficult to bend the belt-shaped ball connecting body, while the returning radius is apparently enlarged, thereby increasing the space of the returning path, so that the conventional belt-shaped ball connecting body cannot completely satisfy the requirements of the industry.

SUMMARY OF THE INVENTION

The present invention has arisen to mitigate and/or obviate the disadvantage of the conventional belt-shaped ball connecting body.

The primary objective of the present invention is to provide a ball connecting body for a rolling motion apparatus, thereby preventing the balls from colliding and rubbing each other.

In accordance with one aspect of the present invention, there is provided a ball connecting body for a rolling motion apparatus, for separating two adjacent balls of the rolling motion apparatus, the ball connecting body comprising multiple spacers, multiple guide linking members, and at least one connecting member, wherein:

the spacers, are located at two sides of the ball, each spacer is provided with a ball retaining face adjacent to the ball;

the guide linking members, are located at the two sides of the ball, for linking the two spacers at the two sides of the ball, so that the ball is maintained in a space formed by the guide linking members and the spacers;

the connecting member, connects two adjacent spacers, a total width of the connecting member in a direction of the connecting line of the two guide linking members is smaller than a total height of the connecting member in a direction vertical to the connecting line of the two guide linking members, so that the connecting member has an excellent bendable capability in the direction of the connecting line of the two guide linking members.

Further benefits and advantages of the present invention will become apparent after a careful reading of the detailed description with appropriate reference to the accompanying drawings.

DETAILED DESCRIPTION OF THE INVENTION

Figure 1:
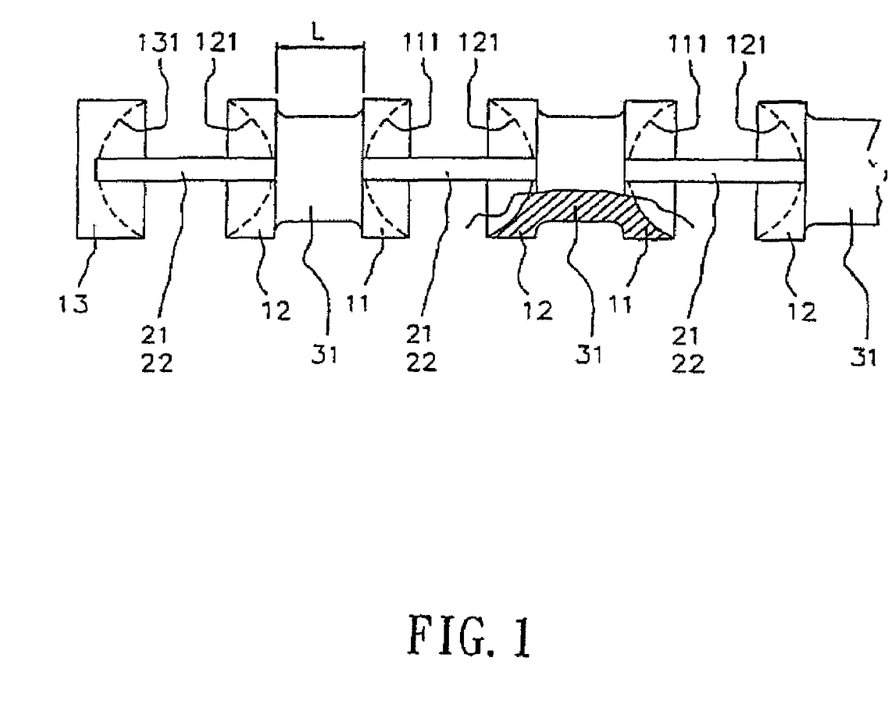
FIG. 1 is a front plan view of a ball connecting body for a rolling motion apparatus in accordance with a first embodiment of the present invention.
Figure 2:
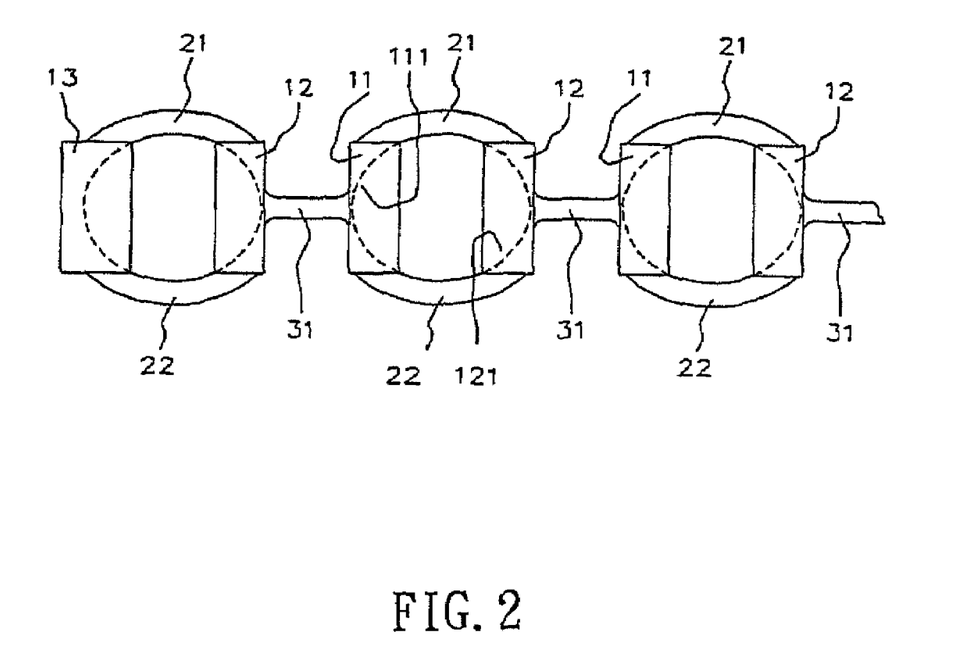
FIG. 2 is a top plan view of the ball connecting body for a rolling motion apparatus as shown in FIG. 1.
Figure 3:
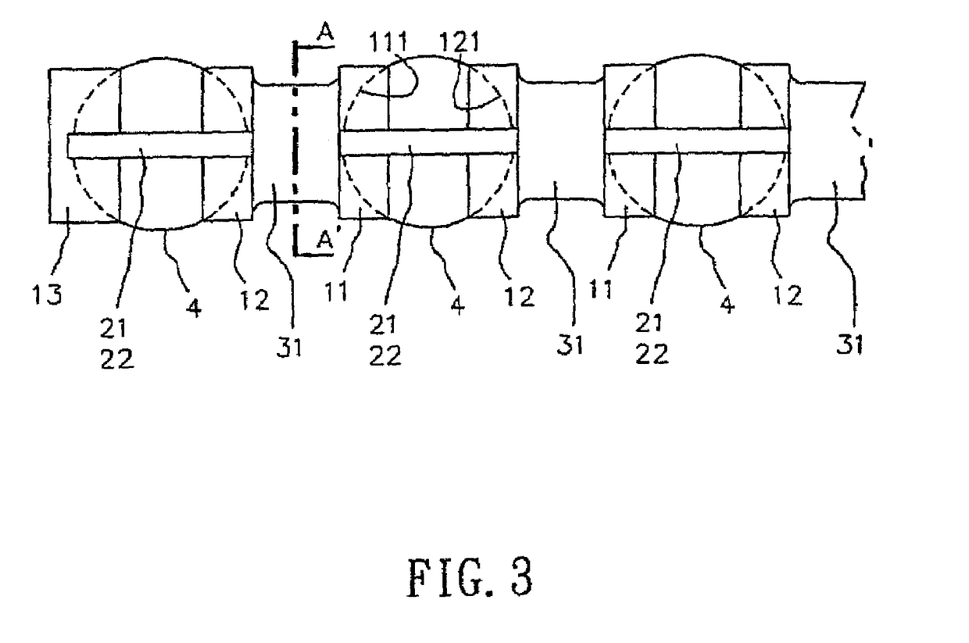
FIG. 3 is a front plan view showing the ball connecting body being assembled with balls.

Referring to the drawings and initially to FIGS. 1-3, a ball connecting body for a rolling motion apparatus in accordance with a first embodiment of the present invention primarily comprises spacers, guide linking members, and connecting members.

Figure 12:
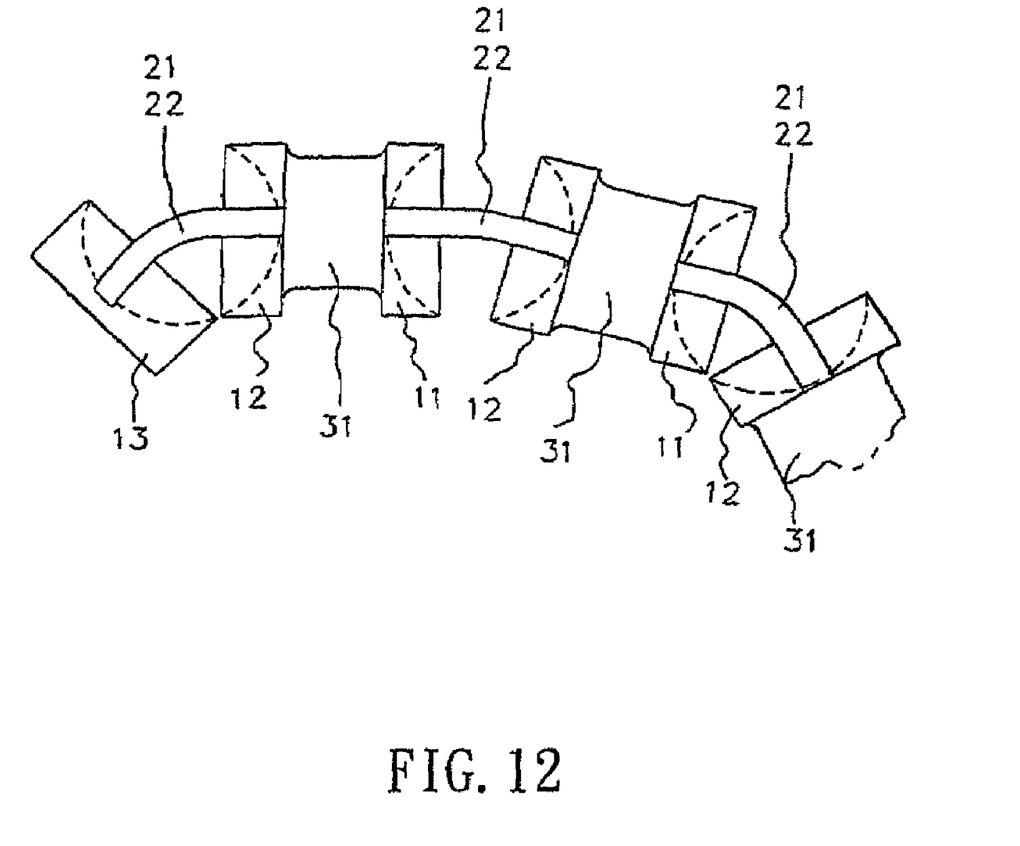
FIG. 12 is another schematic operational view in accordance with the third embodiment of the present invention of showing the ball connecting body being bent along the up and down direction.
Figure 13:
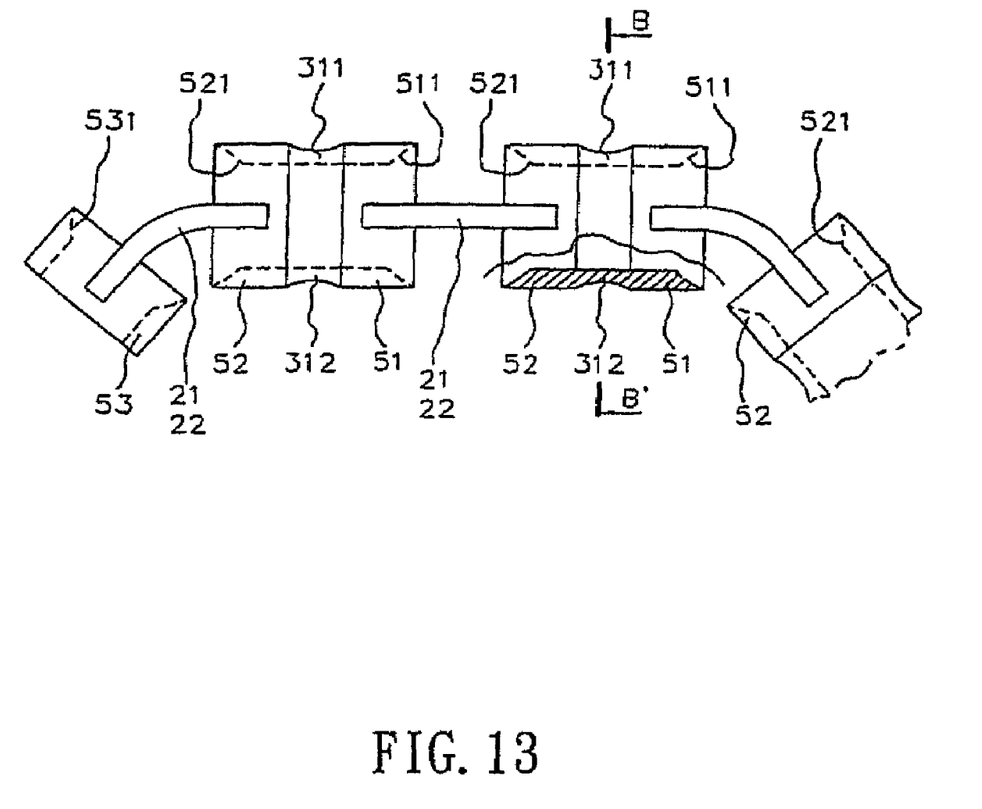
FIG. 13 is another front plan view of a ball connecting body for a rolling motion apparatus in accordance with the third embodiment of the present invention.
Figure 14:
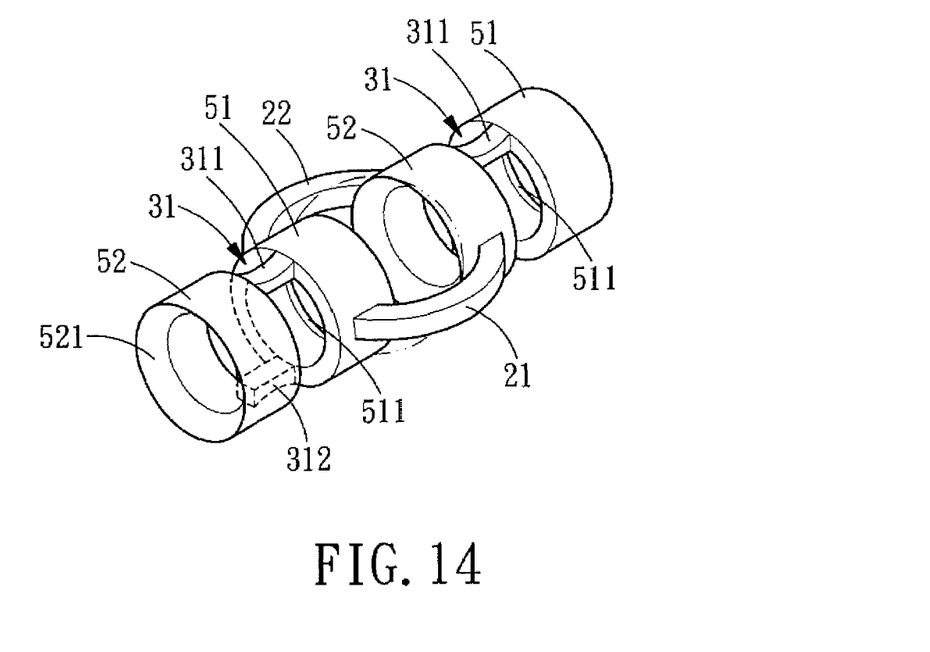
FIG. 14 is an illustrative view in accordance with the third embodiment of the present invention of showing the bar-shaped connecting bars of the ball connecting body.
Figure 15:
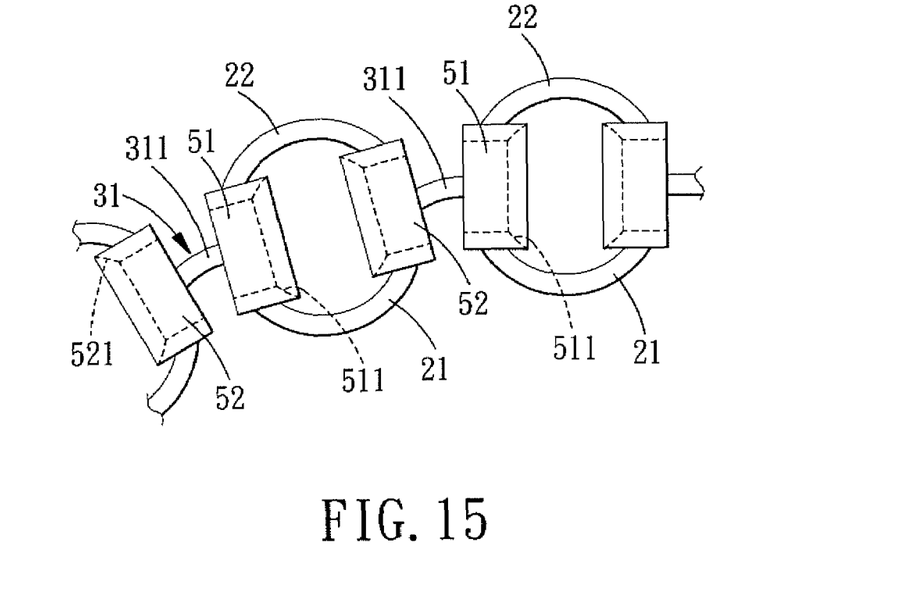
FIG. 15 is another illustrative view of showing the ball connecting body in accordance with the third embodiment of the present invention.

The spacers 11 and the spacers 12 are arranged in a staggered manner, for separating two adjacent balls, so that they do not contact each other, and so that the ball connecting body may move with the balls. The guide linking members 21 and 22 are arranged in pairs with each pair being arranged horizontally. The guide linking members 21 and 22 are located at the two sides of the ball for linking the spacers 11 and its right side adjacent spacers 12, so that the ball is maintained in a space formed by the guide linking members and the spacers. The guide linking members 21 and 22 can be rotated about a horizontal axis relative to the two spacers simultaneously as can be seen in FIGS. 12 and 13, thereby preventing the spacers 11 and the adjacent spacers 12 from arbitrarily rotating during movement, and thereby preventing from increasing the frictional resistance. The connecting members 31 are used to connect the spacers 11 and the left side adjacent spacers 12. The total width of a cross-sectional profile of the connecting member is smaller than the total height of the cross-sectional profile of the connecting member, so that the connecting member 31 has a horizontally bendable capability compared to its vertically bendable capability. The connecting members 31 have an excellent bendable feature in the particular direction, so that the ball connecting body has a multi-directional bendable feature.

As shown in FIG. 1, the right side of the spacer 11 is provided with a ball retaining face 111, while the left side of the spacer 12 is provided with a ball retaining face 121. The ball retaining faces 111 and 121 co-operate to form a spherical face. As shown in FIG. 2, the guide linking members 21 and 22 are arranged between the spacer 11 and the adjacent spacer 12. The guide linking members 21 and 22 are substantially line-shaped, such as a curved line, a straight line, a bent line or the like. As shown in FIG. 2, the inner sides of the guide linking members 21 and 22, and the ball retaining faces 111 and 121 form a circular space for retaining the ball, thereby separating any two adjacent balls, so that they will not contact mutually, and so that the ball connecting body may move with the balls. The spacer 13 located at the tail of the ball connecting body also has a ball retaining face 131. The spacer 13 is usually designed to have a larger thickness, thereby preventing the adjoining ball of the spacer 13 from contacting the ball of another ball connecting body.

Referring to FIG. 3, the ball connecting body is assembled with the balls. The ball retaining face 111 and the right side adjacent ball retaining face 121 surround the outer periphery of the ball 4. The ball 4 is maintained in the space formed by the inner sides of the guide linking members 21 and 22, and the ball retaining faces 111 and 121, and may be rotated relative to the inner sides of the guide linking members 21 and 22, and the ball retaining faces 111 and 121. When the ball 4 is rolling in the rolling motion apparatus, the ball connecting body may move with the ball 4.

Figure 4:
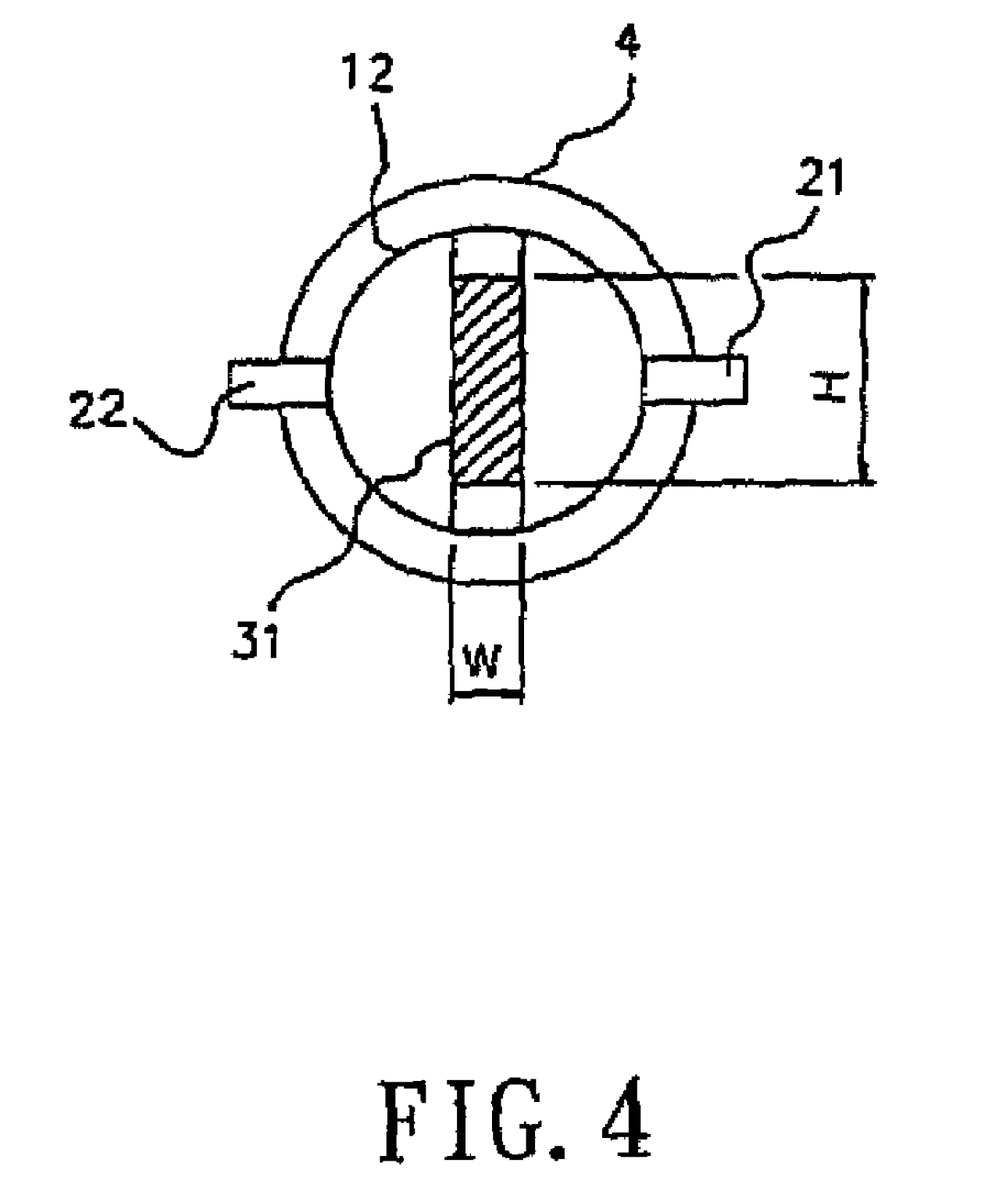
FIG. 4 is a cross-sectional view of the ball connecting body for a rolling motion apparatus along line A-A' as shown in FIG. 3.

The connecting member 31 is used to connect the spacer 11 and the left side adjacent spacer 12, and the length "L" of the connecting member 31 is equal to the distance between the spacer 11 and the left side adjacent spacer 12. As shown in FIG. 1, the local cross-section adjacent to the connecting member 31 indicates that the solid connecting member 31 connects two concave spacers 11 and 12. As shown in FIG. 4, the spacer 12 is substantially circular whose diameter is slightly smaller than that of the ball 4. The guide linking members 21 and 22 are at the two sides of the spacer 12. The cross-sectional height "H" of the connecting member 31 is greater than its width "W". In such a manner, the connecting member 31 may be easily bent along the left and right direction of FIG. 4, and may have an excellent strength, and cannot be broken easily. As shown in FIG. 4, the cross-section of the connecting member 31 is located in the ball 4, so that the connecting member 31 will not interfere with the movement path of the ball 4. The width "W" may be designed to be smaller so that the connecting member 31 is easily bent, while the height "H" may be designed to be greater so that the connecting member 31 has a better strength, so that the height "H" is apparently greater than the width "W". As shown in FIG. 4, part of the guide linking members 21 and 22 exceeds the diameter of the ball 4. The thickness of the portion of the guide linking members 21 and 22 exceeding the diameter of the ball 4 is smaller than the clearance between two relative moving parts of the rolling motion apparatus (e.g., the slider and the rail of the linear guide-way, or the nut and the shaft of the ball screw). When the ball connecting body is used in the rolling motion apparatus, the portion of the guide linking members 21 and 22 exceeding the diameter of the ball 4 may be inserted in the above-mentioned clearance, thereby limiting the movement direction of the ball connecting body, so that the ball connecting body is not rotated arbitrarily, thereby preventing from increasing the frictional resistance between the ball retaining faces 111 and 121 and the ball 4.

Figure 5:
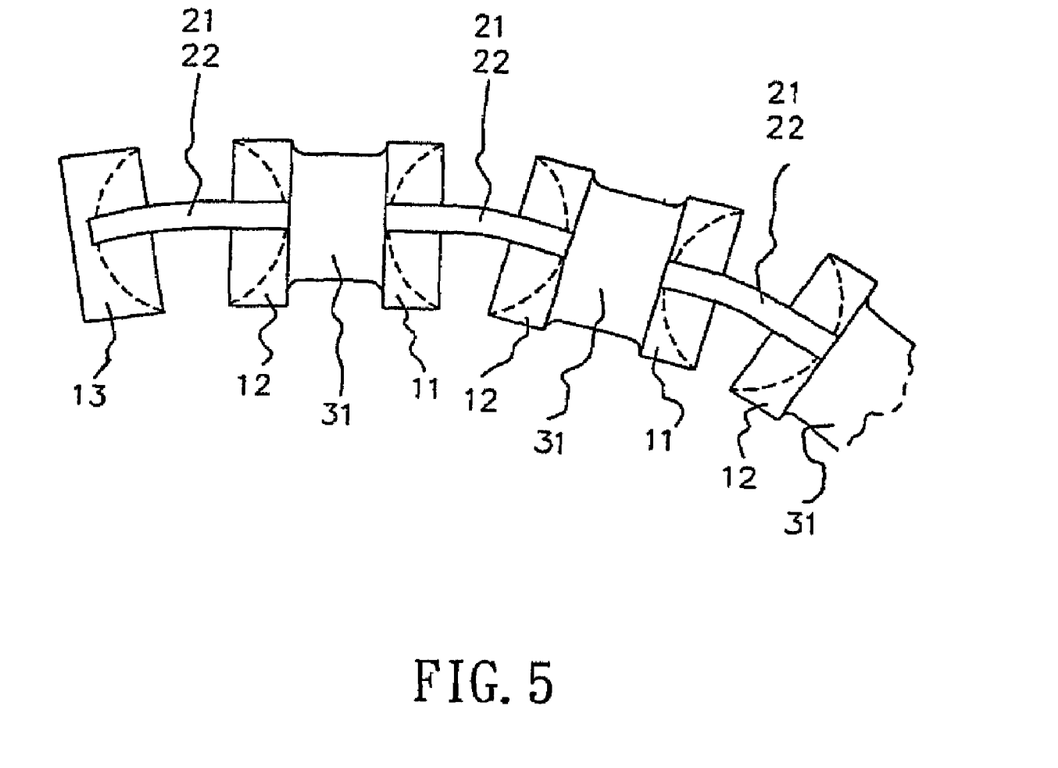
FIG. 5 is a schematic operational view showing the ball connecting body being bent along the up and down direction.
Figure 6:
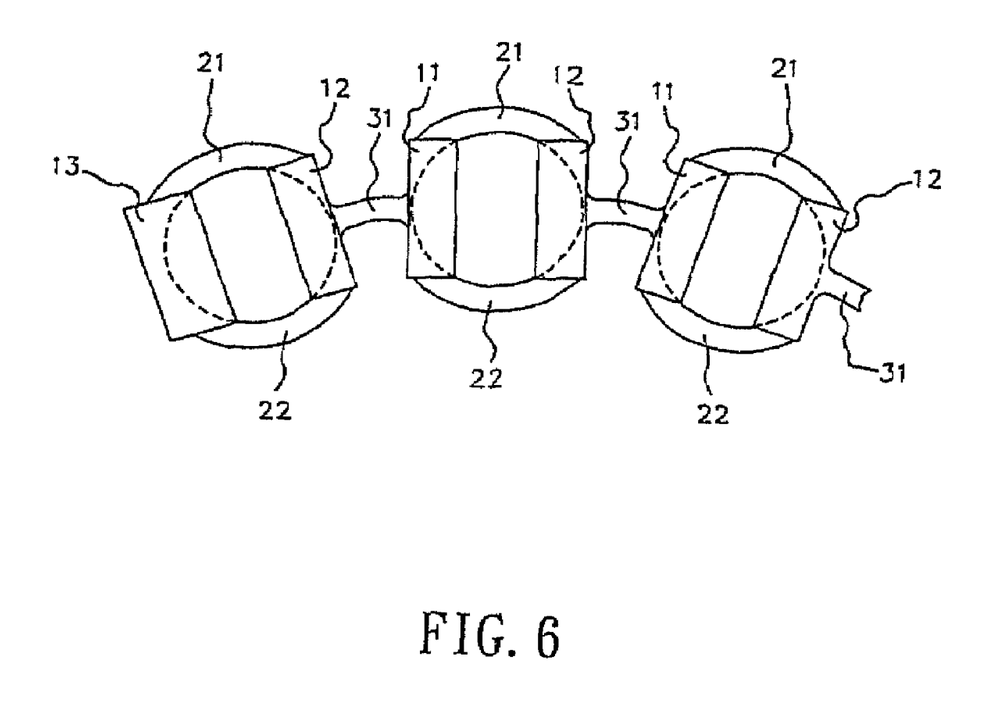
FIG. 6 is a schematic operational view showing the ball connecting body being bent along the left and right direction.

As shown in FIG. 5, the ball connecting body is bent along the up and down direction of FIG. 4. The thickness of the guide linking members 21 and 22 is relatively smaller at this angle, so that they may be bent very easily. As shown in FIG. 6, the ball connecting body is bent along the left and right direction of FIG. 4. The width "W" of the connecting member 31 is relatively smaller, so that it may be bent very easily. Thus, from the above-mentioned description, the ball connecting body of the present invention may be bent along the up and down direction of FIG. 4, and may also be bent along the left and right direction of FIG. 4 by the special design of the connecting member 31. In such a manner, the ball connecting body of the present invention may be bent in multiple directions, and the design of the rolling motion apparatus is more diverse, so that the circulation path of the roller of the rolling motion apparatus needs not to be limited on the two-dimensional plane.

Figure 7:
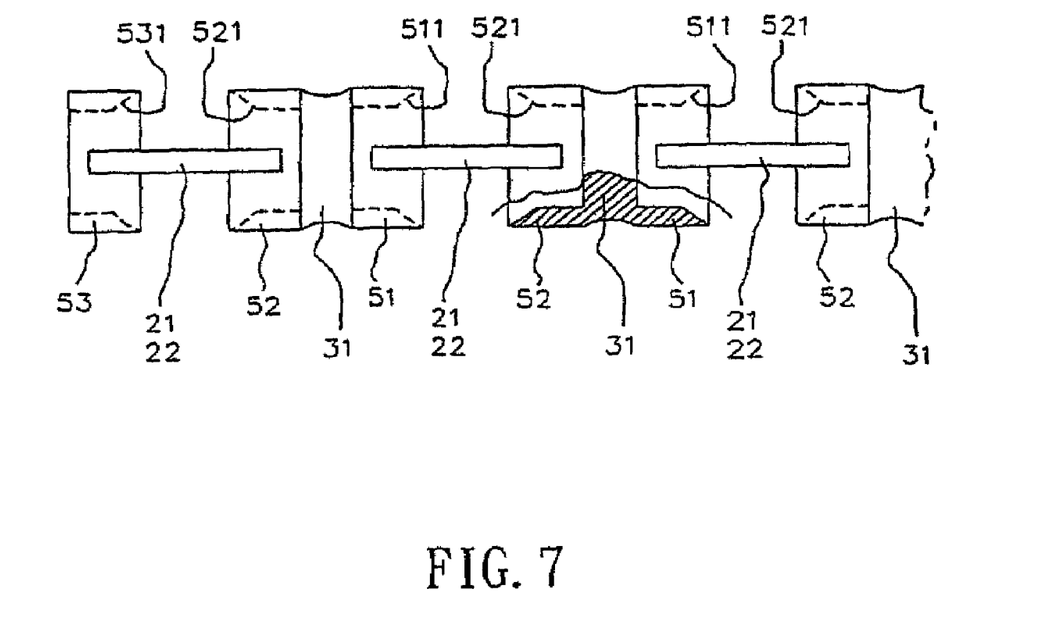
FIG. 7 is a front plan view of a ball connecting body for a rolling motion apparatus in accordance with a second embodiment of the present invention.
Figure 8:
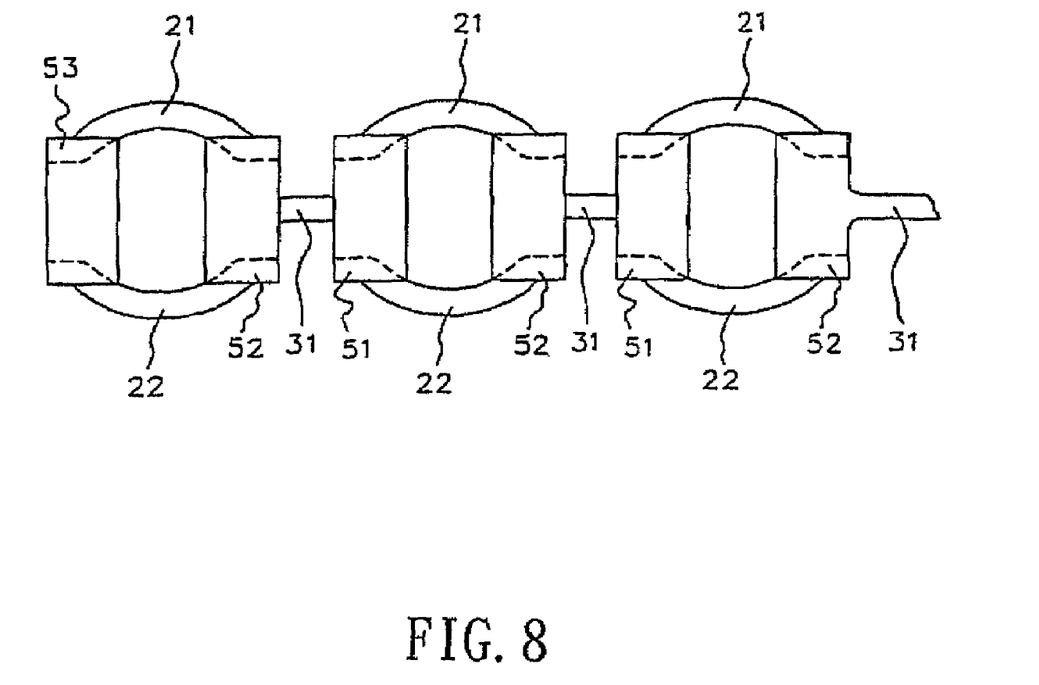
FIG. 8 is a top plan view of the ball connecting body for a rolling motion apparatus as shown in FIG. 7.
Figure 9:
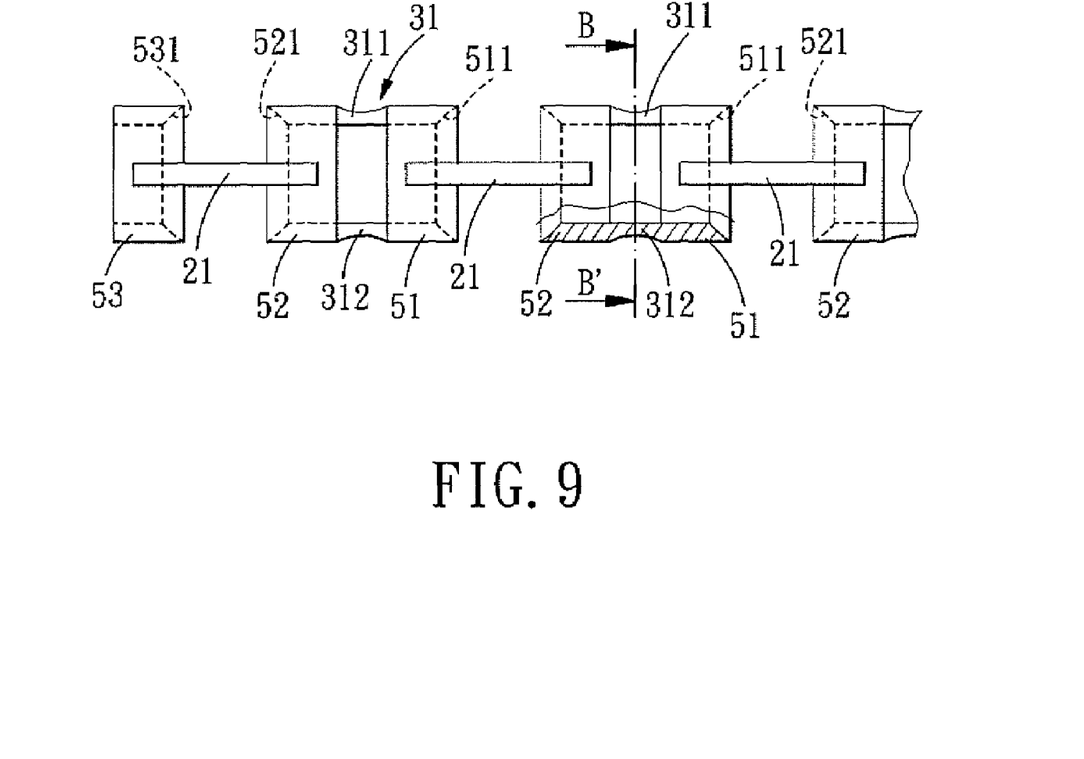
FIG. 9 is a front plan view of a ball connecting body for a rolling motion apparatus in accordance with a third embodiment of the present invention.

Referring to FIGS. 7 and 8, in accordance with a second embodiment of the present invention, each of the spacers 51, 52 and 53 is designed to have a hollow ring shape, and is respectively formed with a ball retaining face 511, 521 and 531. By the ring-shaped hollow design, the lubricating oil may flow more conveniently, thereby providing a better lubrication and heat transfer effect to the ball 4. The connecting member 31 is a solid rectangular body.

Figure 10:
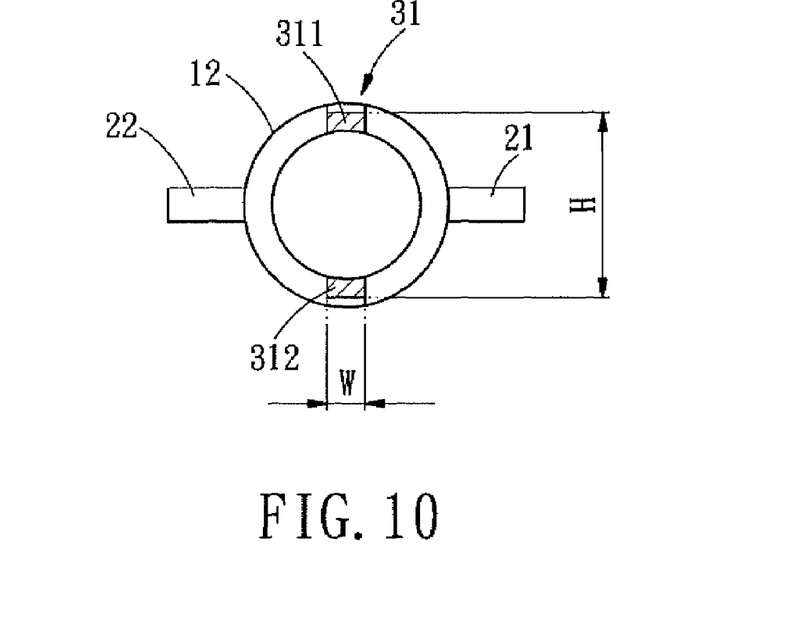
FIG. 10 is a cross-sectional view of the ball connecting body for a rolling motion apparatus along line B-B' as shown in FIG. 9.

FIGS. 9, 10, and 12-15 show a ball connecting body in accordance with a third embodiment of the present invention. The connecting member 31 of FIG. 7 crosses the hollow portion of the center of the spacers 51 and 52, thereby forming a baffle to affect flow of the lubricating oil. For facilitating flow of the lubricating oil, as shown in FIGS. 9, 10, 12, 13, 14 and 15 the connecting member 31 is a hollow structure having two parallel bar-shaped connecting bars 311 and 312. It is hollow between the two bar-shaped connecting bars 311 and 312. The two bar-shaped connecting bars 311 and 312 are used to connect the spacers 51 and 52. Thus, the cross-sectional shape of the two connecting bars 311 and 312 may be circular, square or the like without any limitation. As shown in FIG. 10, the distance H between the outer surfaces of the two connecting bars 311 and 312 is greater than the width W of the respective connecting bars 311 and 312, such that the connecting member 31 is more bendable horizontally than vertically (the horizontal direction is the direction from the guide linking members 21 to 22, and the vertical direction means the direction from the connecting bar 311 to the connecting bar 312), besides, the connecting member 31 has an excellent strength and is less likely to be broken.

Figure 11:
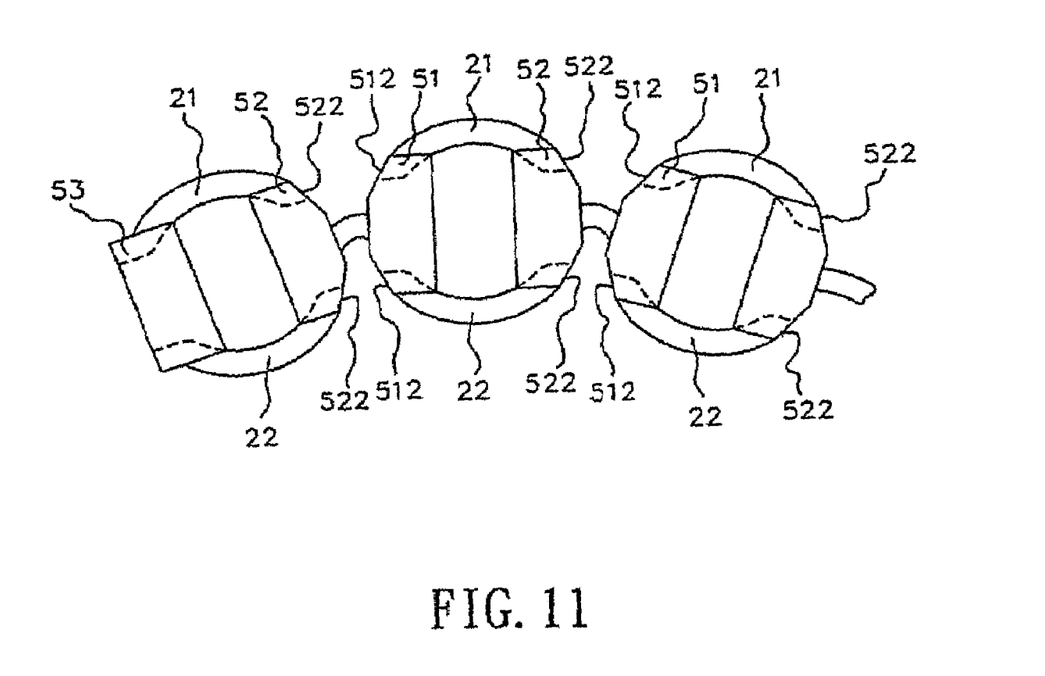
FIG. 11 is a schematic view of a ball connecting body for a rolling motion apparatus in accordance with a fourth embodiment of the present invention.

The length "L" of the connecting member may be reduced to reduce the distance between two adjacent balls, thereby increasing the efficient ball number. However, if the length "L" of the connecting member is reduced, the two spacers at the two sides of the connecting member easily hit each other when the connecting member is bent. Referring to FIG. 11, in accordance with a fourth embodiment of the present invention, the two spacers 51 and 52 are respectively formed with chamfered edges 512 and 522 located adjacent to the connecting member 31, thereby preventing the spacers from colliding each other, and thereby increasing the bendable angle of the connecting member.

Accordingly, in accordance with the present invention, the structure of the connecting member has an excellent bendable capability, while the guide linking member has an excellent bendable capability along another direction, so that the ball connecting body in accordance with the present invention has a multi-directional bendable function and a great strength, and is not broken easily, so that the ball screw and the linear guide-way may have a diverse circulation manner, thereby satisfying the requirement of a shortened mechanism. In addition, the spacer is designed hollow, thereby enhancing the lubrication and heat dissipation effects. Further, the spacer is formed with a chamfered edge adjacent to the connecting member, thereby increasing the bendable angle of the connecting member.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A ball connecting body for a rolling motion apparatus, the ball connecting body comprising multiple spacers, multiple guide linking members, and at least one connecting member, wherein:

the spacers are located at two sides of a ball, each spacer is provided with a ball retaining face adjacent to the ball;

the guide linking members are arranged in pairs with each pair being arranged horizontally and are located at the two sides of the ball, for linking the two spacers at the two sides of the ball, so that the ball is maintained in a space formed by the guide linking members and the spacers;

the connecting member has two connecting bars that serve to connect two adjacent spacers, a distance between outer surfaces of the two connecting bars is greater than a width of each of the connecting bars, so that the connecting member is more bendable horizontally than vertically;

the guide linking members can rotate about a horizontal axis relative to the two spacers simultaneously.

2. The ball connecting body for a rolling motion apparatus in accordance with claim 1, wherein each of the spacers is hollow.

* * * * *